(12) United States Patent
Ren

(10) Patent No.: US 6,760,908 B2
(45) Date of Patent: Jul. 6, 2004

(54) EMBEDDED SOFTWARE UPDATE SYSTEM

(75) Inventor: Yuqing Ren, San Diego, CA (US)

(73) Assignee: Namodigit Corporation, San Diego, CA (US)

(*) Notice: Subject to any disclaimer, the term of this patent is extended or adjusted under 35 U.S.C. 154(b) by 0 days.

(21) Appl. No.: 10/195,199

(22) Filed: Jul. 15, 2002

(65) Prior Publication Data

US 2003/0084434 A1 May 1, 2003

Related U.S. Application Data

(60) Provisional application No. 60/305,704, filed on Jul. 16, 2001, and provisional application No. 60/354,915, filed on Feb. 8, 2002.

(51) Int. Cl.[7] .................................................. G06F 9/44
(52) U.S. Cl. ....................................................... 717/173
(58) Field of Search .......................... 717/173; 709/221

(56) References Cited

U.S. PATENT DOCUMENTS

| | | | |
|---|---|---|---|
| 4,954,941 A | | 9/1990 | Redman ...................... 717/162 |
| 5,666,293 A | | 9/1997 | Metz ........................... 709/220 |
| 5,689,825 A | | 11/1997 | Averbuch et al. ........... 455/418 |
| 5,699,275 A | | 12/1997 | Beasley et al. ............. 709/221 |
| 5,896,566 A | | 4/1999 | Averbuch et al. ........... 455/419 |
| 5,923,886 A | | 7/1999 | Chen et al. .................. 717/170 |
| 5,936,667 A | | 8/1999 | Saib et al. ................... 348/180 |
| 5,991,517 A | * | 11/1999 | Harari et al. ................... 714/3 |
| 6,002,941 A | | 12/1999 | Ablay et al. ................. 455/518 |
| 6,031,830 A | | 2/2000 | Cowan ........................ 370/338 |
| 6,049,830 A | | 4/2000 | Saib ............................ 709/231 |
| 6,134,711 A | | 10/2000 | Nakamura et al. .......... 717/169 |
| 6,167,567 A | * | 12/2000 | Chiles et al. ................ 717/173 |
| 6,202,208 B1 | | 3/2001 | Holiday, Jr. ................. 717/166 |
| 6,223,291 B1 | | 4/2001 | Puhl et al. ................... 713/201 |
| 6,237,091 B1 | | 5/2001 | Firooz et al. ................... 713/1 |
| 6,263,499 B1 | | 7/2001 | Nakamura et al. .......... 717/171 |
| 6,330,715 B1 | | 12/2001 | Razzaghe-Ashrafi ........ 717/171 |
| 6,353,926 B1 | | 3/2002 | Parthesarathy et al. ..... 717/170 |
| 6,366,898 B2 | | 4/2002 | Taivalsaari et al. ............ 707/1 |
| 6,378,069 B1 | | 4/2002 | Sandler et al. .............. 713/153 |
| 6,397,385 B1 | | 5/2002 | Kravitz ........................ 717/173 |
| 6,414,876 B1 | * | 7/2002 | Harari et al. ........... 365/185.22 |
| 2002/0012329 A1 | | 1/2002 | Atkinson et al. ............ 370/330 |
| 2002/0026474 A1 | | 2/2002 | Wang et al. ................. 709/203 |
| 2002/0042886 A1 | | 4/2002 | Lahti et al. .................. 713/201 |
| 2002/0073304 A1 | * | 6/2002 | Marsh et al. ................... 713/1 |

OTHER PUBLICATIONS

Hauptmann et al., "On–line Maintenance with On–the–fly Software Replacement" pp. 70–80; Philips Research laboratories, Aachen, Germany.

* cited by examiner

Primary Examiner—John Chavis
(74) Attorney, Agent, or Firm—Philip K. Yu; East IP Group

(57) ABSTRACT

A method and system for an embedded software update system, which helps manufactures or vendors avoid costly product recall activities in the event their digital products have field software errors ("bugs") or hardware problems. One aspect of the present invention is directed to an error correction system, which remotely corrects these software errors and minimizes influences of hardware problems. Another aspect of the present invention is directed to a software updating system, which is capable of updating software modules in the digital products by use of software patches. The software patch system of the present invention facilitates manufactures' transmitting software patches to the "on-the-fly" digital products to fix software errors and minimize influences of hardware problems. The software patch may also contain new parameters for updating some data area in NVM (Non Volatile Memory), EEPROM (Electrically Erasable Programmable Read-Only Memory) memory of a digital product, which is quite useful when service providers or manufactures want to modify some service features or product features.

54 Claims, 8 Drawing Sheets

Directly jump to patch program when there is a patch for Section K

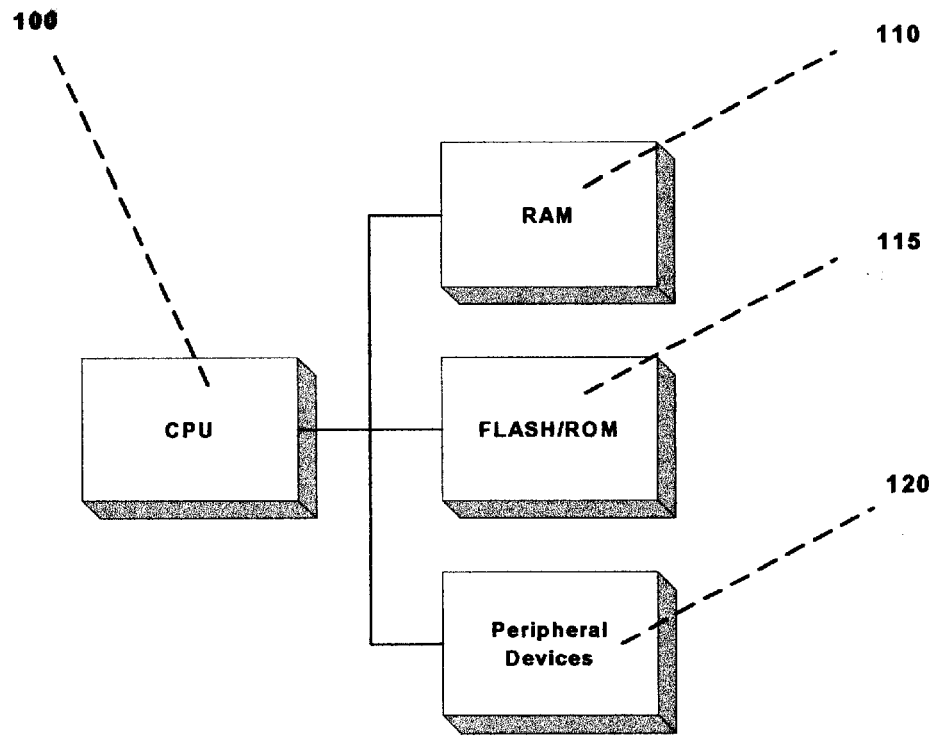
Figure 1 Typical Microprocessor System (PRIOR ART)
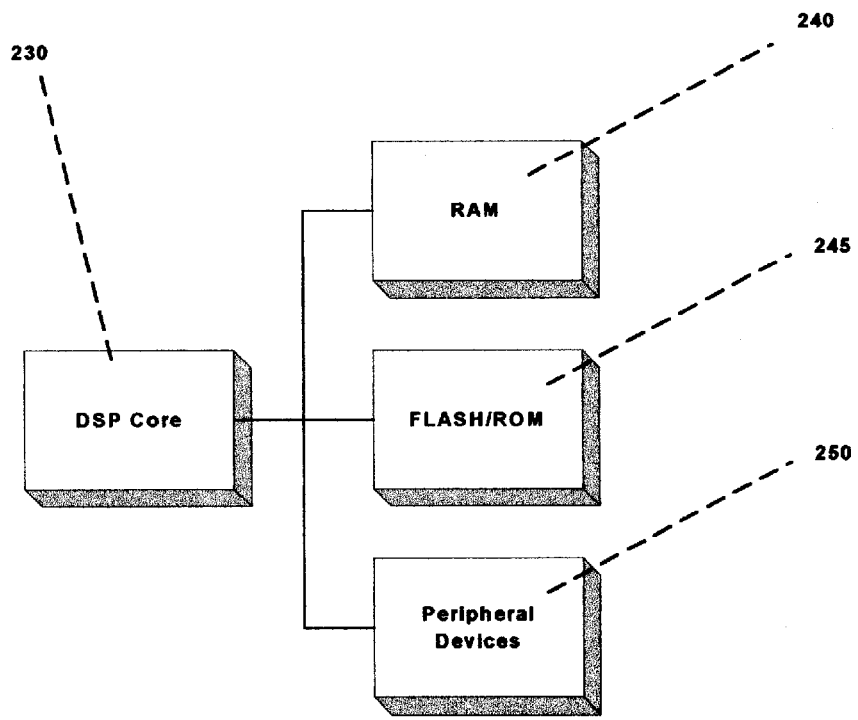
Figure 2 Typical DSP System (PRIOR ART)

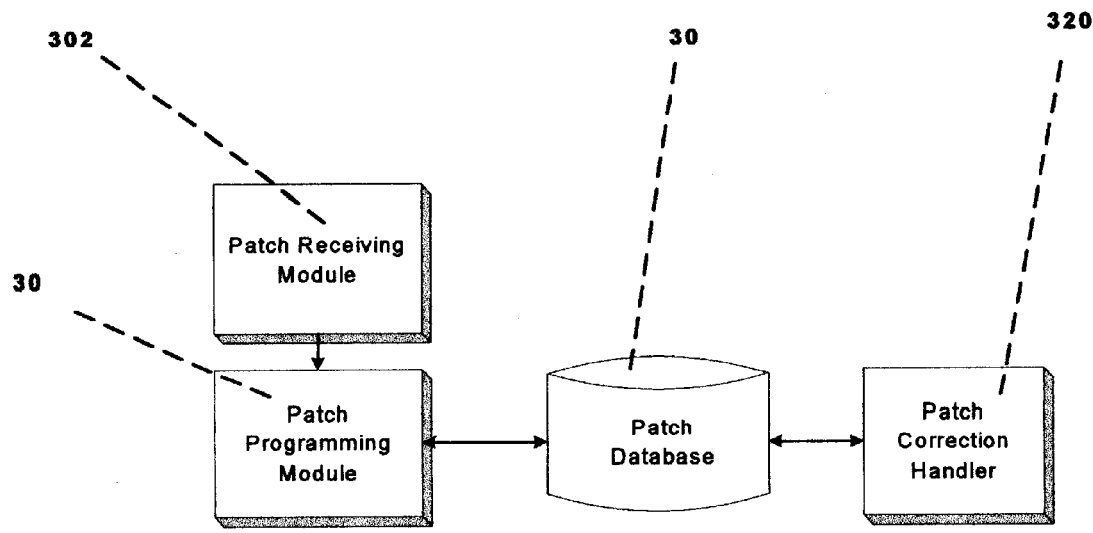
Figure 3  Software Architecture of Patch System in a Digital Product
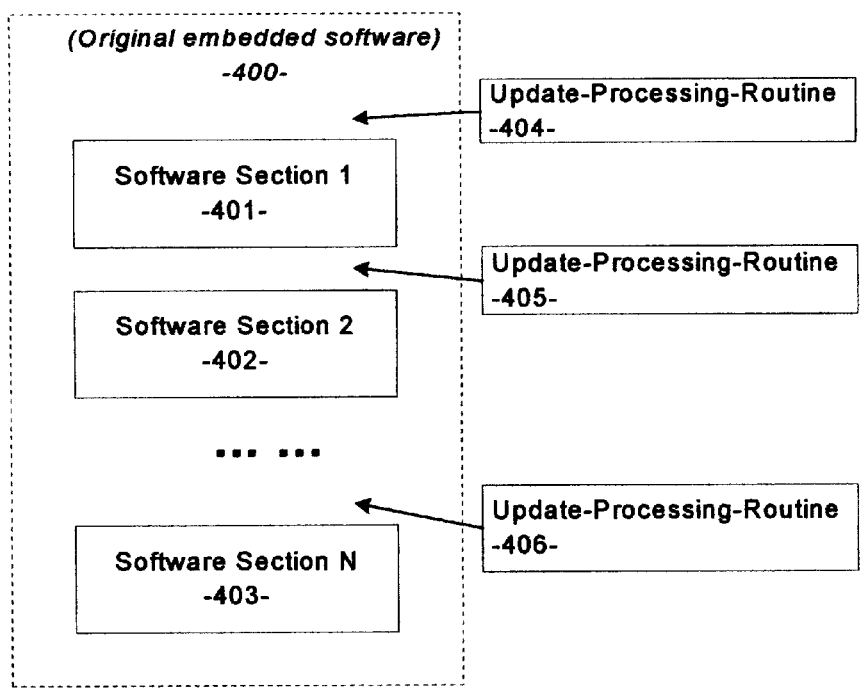
Figure 4  Software Sections and Update-Processing-Routines

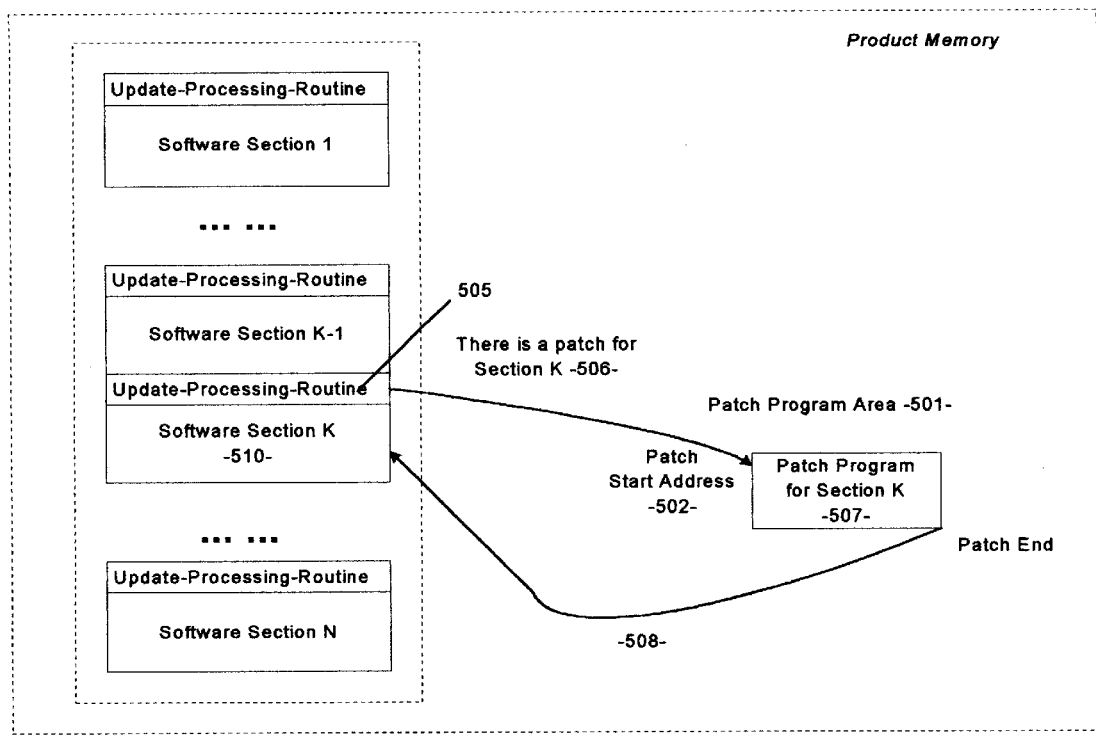
Figure 5   Directly jump to patch program when there is a patch for Section K

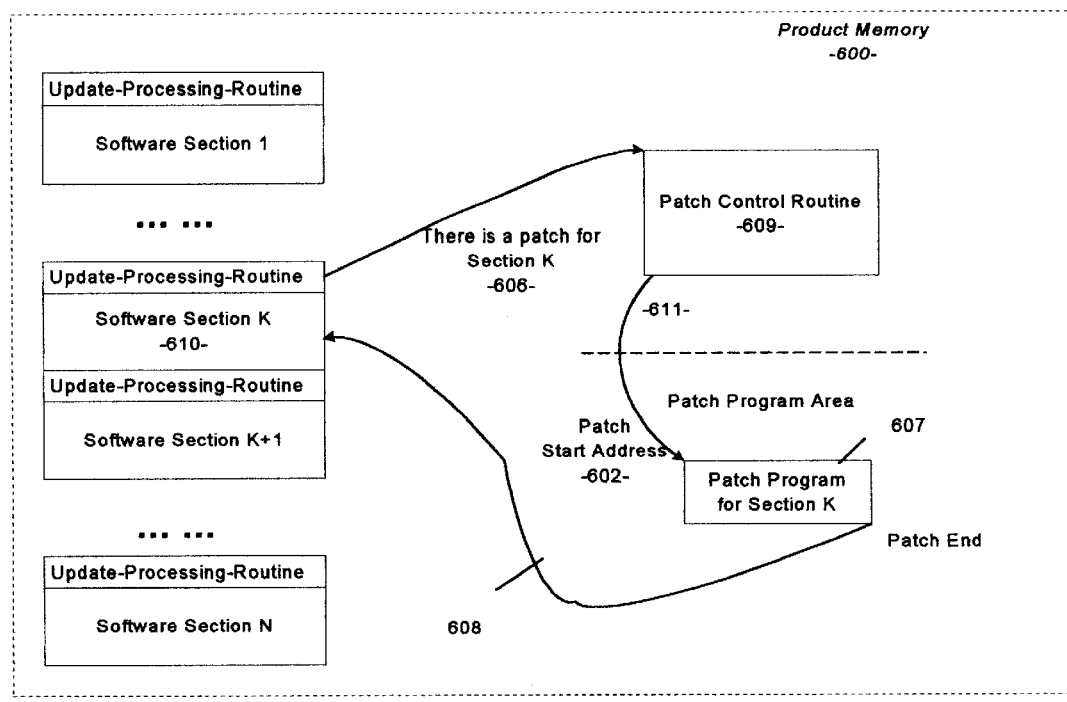
Figure 6    Jump to Patch Program through Patch Control Routine when there is a patch for Section K

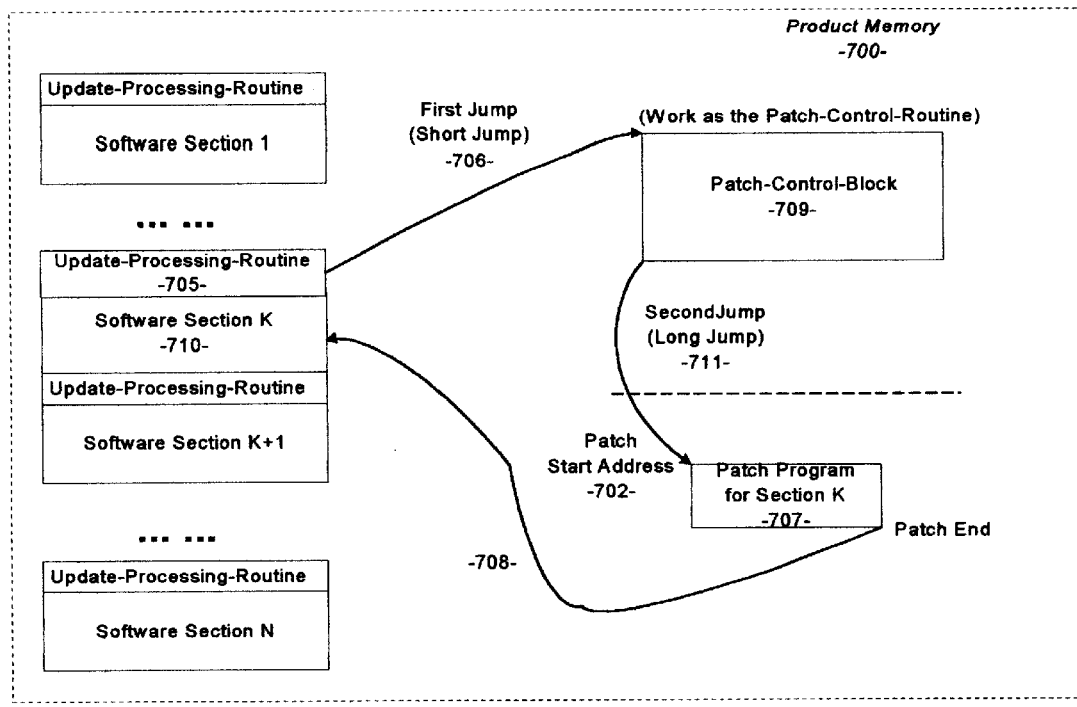
Figure 7  Jump to Patch Program through Patch-Control-Block
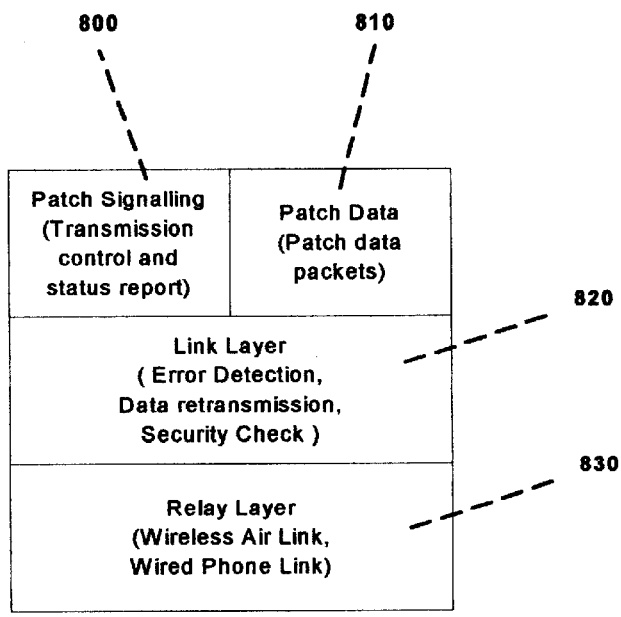
Figure 8  Communication Layers for Patch Transmission

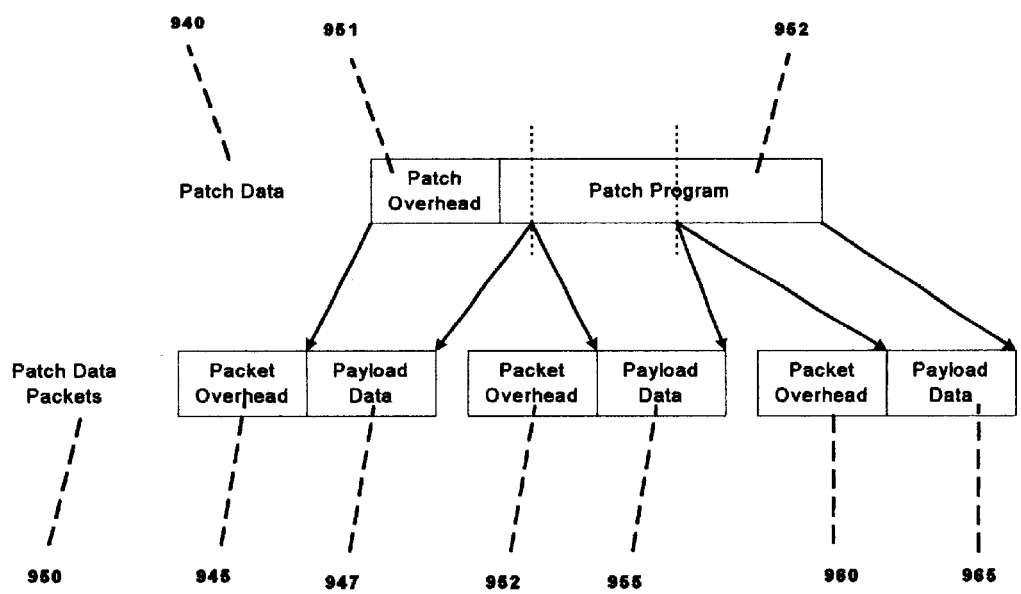
Figure 9 Patch Data and Patch Data Packets

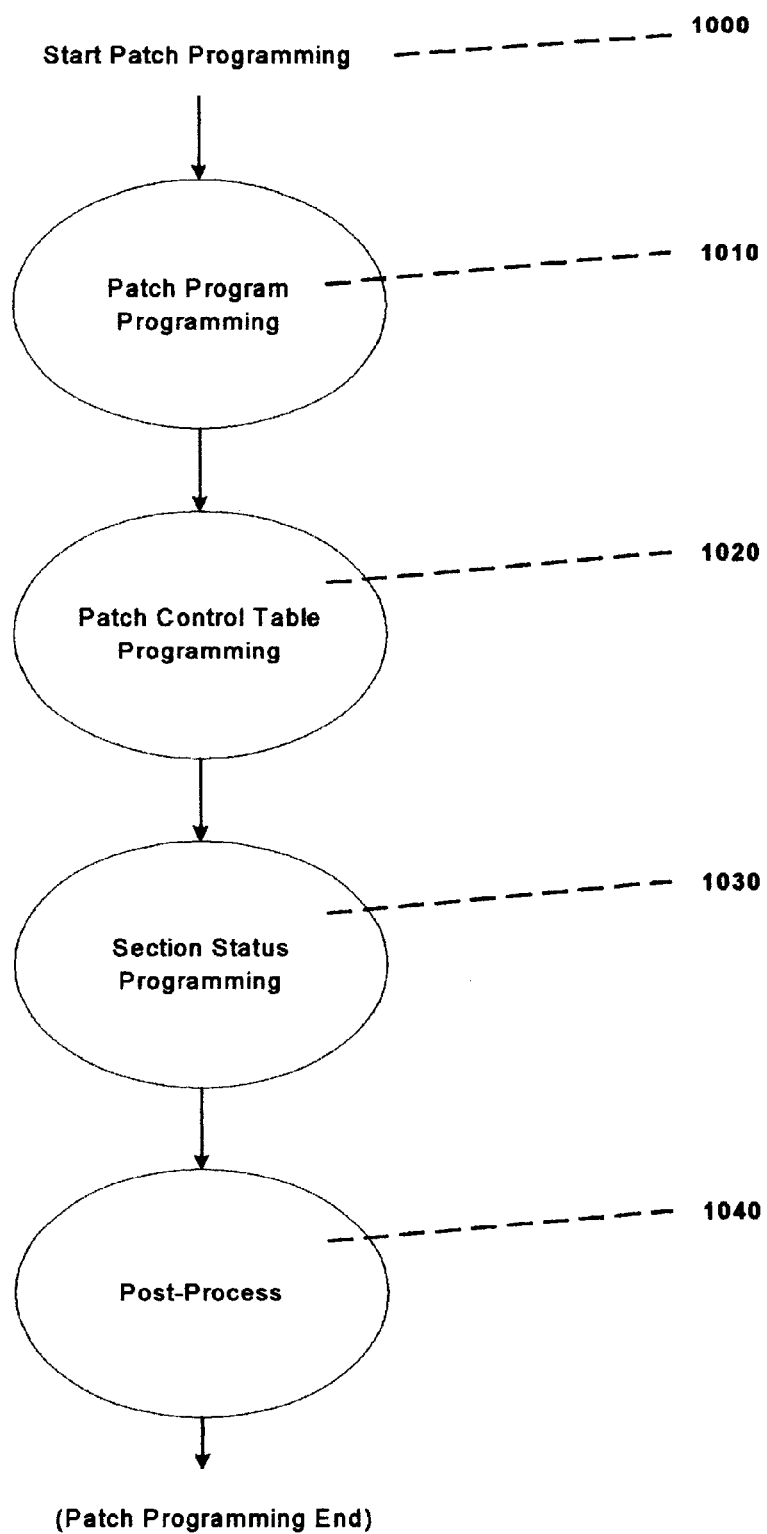
Figure 10  Patch Programming Substates

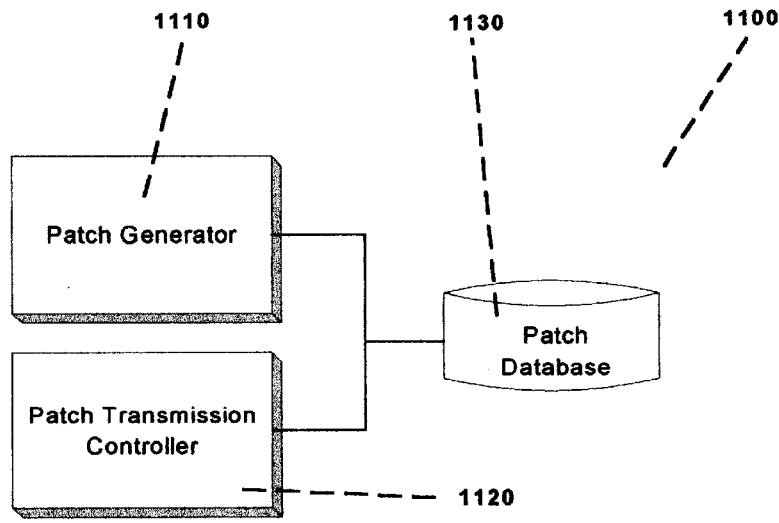
Figure 11  Software Architecture of Patch Server
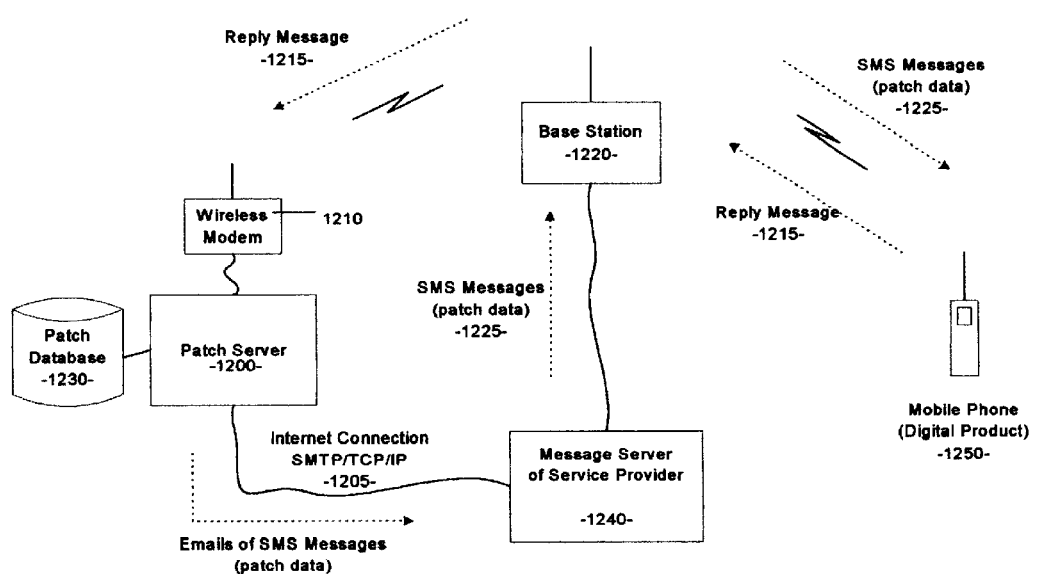
Figure 12  Exemplary Design on Patch Transmission Using SMS

EMBEDDED SOFTWARE UPDATE SYSTEM

RELATED APPLICATION

The present application claims priority from provisional applications, Application No. 60/305,704, entitled "Embedded Software Patch System", filed on Jul. 16, 2001, and No. 60/354,915, entitled "Embedded Software Patch System", filed Feb. 8, 2002. The prior applications are hereby incorporated into this application by reference as if fully set forth herein.

FIELD OF THE INVENTION

The present invention is related to digital electronics products with embedded software operating systems, and more particularly related to a system and method of updating, correcting, modifying or upgrading the embedded software in such digital products before or after the products have been released to market by use of software patches.

ART BACKGROUND

Progress and innovation in digital technology have changed how people live, work or play. The miniaturization of computers, cellular phones, personal digital assistances ("PDA"), simple pagers, PCMCIA wireless modem cards, or other wireless modem cards using public standard or proprietary I/O connectors offer prime examples of how technology makes themselves more and more indispensable. Together, they help people work more efficiently and productive, stay connected with loved ones and have more access to information and entertainment.

For the digital products, such as cellular phones, PDAs and set-top boxes, their digital technology is based on large-scale embedded software system. Embedded software systems in those digital products normally have more than tens of thousands of lines in their source codes. And inevitably, software bugs exist in these embedded software systems that may cause malfunctions in the digital products. Some bugs that are so fatal may even force manufactures to recall their digital products. Due to the cost involved in a product recall, some manufactures have decided to avoid certain market space altogether, or at least until production quality and reliability improve. Of course, the resulting public relations ("PR") nightmare and potential loss of consumer confidence also play a significant role in their decisions.

Despite improvement in various stages of digital product development and manufacturing, defects are invariably part of the process. Further, as digital products become more advanced and complex, they are more vulnerable to bugs or defects in software, hardware, material or manufacturing. Many preventive measures can be implemented to minimize or detect defects before the products are released to the end users. However, once the digital products are released to the field, efforts to fix bugs or defects may become a potential recall nightmare. For defects occurring in limited lots, the end users may be asked to return the products for service or replacement. The end users may tolerate such inconvenience if it rarely occurs and if the vendors provide loan units for the time being.

For defects in massive scales involving many lots, the end users may still be asked to bring the digital products back for service or replacement. However, in such massive scales, the vendors may not even have enough resources to timely repair or replace the defective units. While loaners can be offered to the end users for the duration, the vendors must first have that many units in stock for temporary usage by the end users. Such temporary usage presents a loss of revenue opportunity for those units in stock, since the vendors cannot put them in their ordinary and profitable use.

Additionally, even after a digital product has been released to the field, manufactures will sometimes go through improvement, enhancement or upgrades, which may require a change in the embedded software. For major changes, manufactures may generate a new round of product release, which may be costly but necessary. However, for minor changes, they are confronted with the choice of having to go through a premature product release, or holding off until there are many minor changes to be made. A premature and untimely product release drains the company's resources, while holding off risks antagonizing the end users who might complain about the minor inconvenience.

Therefore, it is desirable to minimize product recall for those digital products based on embedded software systems.

It is also desirable to minimize intermediary product releases for those digital products.

It is also desirable to be able to fix, repair, update, upgrade or enhance those digital products with reduced rounds of product release.

SUMMARY OF THE PRESENT INVENTION

The present invention is directed to a method and system for an embedded software update system, which helps manufactures or vendors avoid costly product recall activities in the event their digital products have field software errors ("bugs") or hardware problems. One aspect of the present invention is directed to an error correction system, which remotely corrects these software errors and minimizes influences of hardware problems. Another aspect of the present invention is directed to a software updating system, which is capable of updating software modules in the digital products by use of software patches. The software patch system of the present invention facilitates manufactures' transmitting software patches to the "on-the-fly" digital products to fix software errors and minimize influences of hardware problems. The software patch may also contain new parameters for updating some data area in NVM (Non Volatile Memory), EEPROM (Electrically Erasable Programmable Read-Only Memory) memory of a digital product, which is quite useful when service providers or manufactures want to modify some service features or product features.

The software update system of the present invention has advantages over the conventional software upgrade/updating systems. The software update system only needs comparatively small memory space to save software patches for bug fixes, or for key modules update. This is particularly advantageous to the small, portable digital products, whereas conventional software update/upgrade systems require large memory space to contain the whole application data of a new software version received for upgrade.

The proposed update system requires only limited network resources for patch data transmission, since each patch size is normally very small, whereas conventional software upgrade/updating systems require much more bandwidth or network resources for transmitting the big blocks of application data for software version updating.

Due to the ever-increasing pace for technology advancement in digital products, new standards, specifications and service features are being upgraded much sooner than before. Such upgrade would normally require new digital hardware to support the new advanced features. Another aspect of the software patch system of the present invention makes it simpler and more economic to do upgrades through software, thus minimizing the need to do frequent hardware changes. Additionally, the software update system of the present invention can be added to fix problems hidden in the operating system that support application downloading, such as Java Virtual Machines, or BREW ("Binary Runtime Environment for Wireless").

A further aspect of the present invention separates embedded software intended for digital products into multiple sections and only updates the necessary sections. This approach is advantageous over the conventional approach of having to update the total system, since it will optimize usage of resources for network transmission.

Hardware designs for CPU, MCU or DSP processors may also include the mechanism of checking update software in accordance with the present invention before running a software section. CPU/MCU/DSP can be designed in such a way that it is capable of automatically checking software update information while running the embedded software, and automatically jumping to the updated code address when software update is available.

BRIEF DESCRIPTION OF THE DRAWINGS

FIG. 1 illustrates a simplified diagram of a conventional microprocessor system in a digital product.

FIG. 2 illustrates a simplified diagram of a conventional DSP system in a digital product.

FIG. 3 illustrates an exemplary software architecture of a patch system in a digital product.

FIG. 4 illustrates a simplified diagram of an exemplary software sectioning and Update-Processing-Routine allocation of the original embedded software in a digital product.

FIG. 5 illustrates an exemplary design and implementation of software update based on software sections in accordance with one embodiment of the present invention.

FIG. 6 illustrates an exemplary design and implementation of software update using JUMP to patch program through Patch Control Routine in accordance with another embodiment of the present invention.

FIG. 7 illustrates an exemplary design and implementation of software update using JUMP to patch program through Patch-Control-Block in accordance with yet another embodiment of the present invention.

FIG. 8 illustrates exemplary communication layers for patch transmission in accordance with one embodiment of the present invention.

FIG. 9 illustrates an exemplary format of the patch data and patch data packets in accordance with one embodiment of the present invention.

FIG. 10 illustrates an exemplary state diagram of patch programming in accordance with the present invention.

FIG. 11 illustrates an exemplary architecture for a patch server in accordance with the present invention.

FIG. 12 illustrates an exemplary design of patch transmission using SMS messages.

DETAILED DESCRIPTION OF THE PREFERRED EMBODIMENT

1. A method and system for an embedded software update system for digital products is disclosed. In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to avoid unnecessarily obscuring the present invention. Additionally, headings are used throughout the description as a matter of convenience and for ease of references only. It should note that what is meant by "embedded software" herein is the software program written in C/C++/Java/Assembler, or other software programming languages, as well as any executable machine code of CPU/Microprocessor or DSP ("Digital Signal Processor"), for operating the digital product.

2. System Architecture

The software update system of the present invention will first be described from a system architecture perspective. Reference is to FIG. 1, where a simplified conventional microprocessor system is illustrated. A microprocessor system in a typical digital product may comprise a CPU ("Central Processing Unit") 100, RAM ("Random Access Memory") 110, FLASH/ROM memory 115, and some peripheral devices 120. A software program resides in FLASH/ROM memory 115, and is read by CPU 100 during execution. FLASH is a type of constantly-powered nonvolatile memory that can be erased and reprogrammed in units of memory called blocks. ROM stands for "Read Only Memory".

Similar to the microprocessor system of FIG. 1, a DSP ("Digital Signal Processor") system in a conventional digital product may comprise a DSP core 230, RAM 240, FLASH/ROM memory 245, and some peripheral devices 250, as shown in FIG. 2. A software program resides in FLASH/ROM memory 45, and is read by DSP core 30 during execution.

A typical digital product, e.g. a digital cellular phone, normally contains a microprocessor system, and may also contain a DSP system. The software update system of the present invention can be configured or adapted to reside in the embedded software of the microprocessor system and/or the DSP system of a digital product. The software update system in accordance with one embodiment of the present invention, when it is implemented in a digital product, may be structured to comprise a software module 302 for patch receiving, a software module 304 for patch programming, a patch database 310, and a patch correction handler 320. A simplified drawing of exemplary software architecture in a digital product is illustrated in FIG. 3.

Referring to FIG. 3, the patch receiving module 302 is for receiving software patch data. It may include mechanism for data receiving either from wired link or wireless link, mechanism for data error detection and/or mechanism for data security check. After the patch receiving module 320 correctly receives patch data, it will pass the patch data to the patch programming module 304. The patch programming module 304 is for writing patch data into the patch database 310. It may include program for writing data into FLASH, NVM, EEPROM memory, and/or other types of memory. The patch database 310 is a memory area in FLASH memory and/or other types of memory, which is for containing patch data. The patch correction handler 320 is for handling process for using patch program instead of using original error program. It may include mechanism for jumping to the patch program area from the original software code area that has errors.

3. Software Update Technology 3.1 Separating Software into Software Sections

To take advantage of the software update system in accordance with one embodiment of the present invention, before an embedded software is implemented into a digital product, a plurality of locations in the embedded software are determined at first, so that software update can be started later on from these locations. The locations can be expressed by L1, L2, . . . , Ln, in the order from small address to large address, where n is the total number of the locations.

The part of the embedded software between two successive locations, such as the part between L1 and L2, is treated as a software section, S1, of the embedded software. In this way, the embedded software is effectively "separated" into a plurality of software sections, S1, S2, . . . , Sn, in the order from small address to large address, where n is the total number of the software sections. Note that the last section Sn is started from Ln and ended at the end of the embedded software.

As is with any software, it may be necessary to update or modify an embedded software from time to time. When it is necessary to update certain program codes, which happen to be in a software section, for example S2, updating can be achieved by directing execution of the embedded software in section S2, beginning at location L2, to a software patch. The software patch is then used for execution instead of using the program codes in S2. In some cases, it may be more convenient to start updating from other locations, for example L1, directing execution of the embedded software to a software patch from L1, even if the program codes that need to be updated exist in S2. In other words, it may be preferable in certain situations to direct the execution of the embedded software to a software patch earlier than the intended section.

Size of a software section may not be a fixed number, and can be variable from one section to another, according to the different needs of different sections. Determining locations of L1, L2, . . . , Ln and partitioning embedded software into software sections S1, S2, . . . , Sn, can be based on boundaries of software functions, number of lines of program lines, types of CPU/DSP instructions, software design schemes, hardware design schemes, software modification requirements, or error correction requirements, as can be appreciated by those skilled in the art.

At each location of L1, L2, . . . , Ln, an Update-Processing-Routine is allocated for handling software update. Referring to FIG. 4, a simplified drawing of exemplary software section separation and the Update-Processing-Routine allocation is illustrated. To prepare the embedded software 400, at the beginning of every section 401, 402, 403 of the software 400, an Update-Processing-Routine 404, 405, 406 is allocated in the section.

An Update-Processing-Routine is a software routine that handles software update processing. If there is a software patch for updating certain program codes in a software section, for example S2, the Update-Processing-Routine at location L2 will direct the CPU/DSP execution to the start address of software patch, and use the software patch for execution. This process may involve a Patch-Control-Routine (to be further described in connection with FIG. 6) before jumping to the start address of the patch. If there is no patch for updating a software section S2, the Update-Processing-Routine at location L2 will direct the CPU/DSP execution to use the existing S2 program; that is, the CPU/DSP execution will continue through this routine without affecting normal execution.

The content of the Update-Processing-Routines can be different from one location to another location, or they can be designed in the same way.

3.2 Software Section-Based Software Updating

One exemplary design and implementation of software update based on software sections is shown in FIG. 5. When there exists a software patch for updating software section K 510, the Update-Processing-Routine 505 of software section K, during execution of the software, directs CPU/DSP execution to jump 506 to the start address 502 of patch program 507 for updating software section K. In this way, the patch program 507 will be used for execution instead of original program in section K. After executing the patch program 507, the CPU/DSP instruction pointer is directed to jump 508 to a predetermined place in the original software, which typically is the place right after the program codes that need to be updated in software section 510. As such, any bugs in software section 510 is bypassed by the execution of patch program 507.

Another exemplary design and implementation of software update based on software sections is shown in FIG. 6. When there exists a software patch for updating software section K 610, the Update-Processing-Routine 605 of software section K directs CPU/DSP execution to jump 606 to a Patch-Control-Routine 609. The Patch-Control-Routine 609 is a software routine that performs general patch execution control, such as preparation process for patch program execution and/or determining the start address 602 of patch program 607 based on current patching status and system parameters, for example, a Patch-Control-Table (to be described below). The Patch-Control-Routine 609 directs CPU/DSP execution to jump 611 to the start address 602 of patch program 607 of updating software section K 610. In this way, the patch program 607 will be used for execution instead of original program in section K 610. After executing the patch program, the CPU/DSP instruction pointer is directed to jump 608 to a predetermined place in the original software, which typically is the place right after the program codes that need to be updated.

The aforementioned Patch-Control-Table is a list of information that can be used for controlling patch receiving, patch programming and patch signaling process. This list of information may include a list of identifiers of the patches that have been programmed into the digital product, and/or a list of the corresponding identifiers of the software sections that are updated by those patches. It may also include information of a patch database, such as the number of bytes in the patch program area that can be used for storing new patches. It may include other information for controlling patch receiving, patch programming, and patch signaling processes. The Patch-Control-Table may reside in the Patch-Control-Routine or any other area in the digital product memory 600.

As can be appreciated by those skilled in the art, there may be some advantages in using an intermediate step, such as the Patch-Control-Routine 609, for directing CPU/DSP instruction pointer to jump to the start address 602 of patch program 607 as shown FIG. 6, instead of directly jumping to the start address 502 of patch program 507 as shown in FIG. 5. If a new patch is necessary for the software section that already has a patch for updating, the section identifier of that existing patch can be deleted (e.g., set to zero) at a Patch-Control-Table that is handled by the Patch-Control-Routine 609, while the new patch can be programmed into the Patch-Control-Table with the original section identifier but with different Patch Identifier and/or patch start address. In this way, the Patch-Control-Routine 609 will be able to determine the corresponding new start address of patch program from the Patch-Control-Table, and direct CPU/DSP instruction pointer to jump to the new patch program.

Memory area for containing patch program codes can be allocated at a place outside of the embedded software code area. It can also be allocated at a place inside of the embedded software code area. For example, a memory area in FLASH memory can be reserved as a data area or a data buffer filled with bytes of hexadecimal number "0xFF" in a software program, and this memory can be allocated in the embedded software code area and can be used to contain patch program codes by changing/overwriting these bytes of hexadecimal number "0xFF" to patch program codes.

3.3 Designing Update-Processing-Routine

The methodology in connection with the design and implementation of the Update-Processing-Routines will now be discussed in the following sections.

3.3.1 Designing Update-Processing-Routine Using Patch-Checking-Routine

One exemplary design and implementation of the Update-Processing-Routine is to use patch flags or patch checking routines. In this way, each software section will have a corresponding patch flag and/or a patch checking routine to show whether there is a patch in the patch area for updating this section.

When there is no corresponding patch programmed in the patch area for updating, the Update-Processing-Routine can be shown as follows using program description language, which can readily be translated into C/C++/Java/Assembler and other software programming languages, or executable machine code of CPU/Microprocessor and DSP:

```
(At the beginning of a software section.)
Patch-Checking-Routine
    If (the Patch-Checking-Routine declares that there is a patch for
updating this section)
    {
        Patch-Correction-Routine
    }
    ORIGINAL SECTION CODE.
```

As shown, a Patch-Checking-Routine is used in the above program. The Patch-Checking-Routine is a software routine to check whether there is a patch in the patch area for updating this section of the embedded software. It may check some patch flags or some system parameters, or use some software functions to detect whether there is a patch for updating this software section.

The Patch-Correction-Routine is a software routine to direct CPU/Microprocessor or DSP to use patch program instead of using original section code. The Patch-Correction-Routine may include a pre-process when it is necessary for making preparation for jumping to the patch program, such as saving some parameters or performing some parameter and function setup. The Patch-Correction-Routine also includes some instructions for directing CPU/Microprocessor or DSP instruction pointer to the start address of patch program as shown in FIG. 5, or to a Patch-Control-Routine as shown in FIG. 6. The benefits of using the Patch-Control-Routine have been discussed in Section 3.2.

3.3.2 Designing Update-Processing-Routine Using Jump/Branch Instructions

Another exemplary design and implementation of the Update-Processing-Routine is to use the JUMP (or BRANCH in ARM® parlance) command or similar CPU/DSP instructions. It should be noted that JUMP, a well-known concept in computer programming, is used as a generic term in this application, which means directing execution of CPU/DSP from one location to another location.

When there is no corresponding patch programmed in the patch area for updating the software section, the Update-Processing-Routine can be shown as follows, using program description language, which can readily be translated into C/C++/Java/Assembler and other software programming languages, or executable machine code of CPU/Microprocessor and DSP:

```
(At the beginning of a software section, in case of no patch programmed)
        Jump to Label_O
Label_P:  Patch-Correction-Routine
Label_O:  ORIGINAL SECTION CODE
```

When there is no corresponding patch programmed in the patch area for updating the software section, the first instruction of the Update-Processing-Routine is to JUMP to Label_O, which is the start address of the original code of the section.

When there is a corresponding patch programmed in patch area for updating the software section, the first instruction of the Update-Processing-Routine will be changed, so that CPU/DSP instruction pointer will JUMP to Label_P instead of Label_O. The Update-Processing-Routine can be shown as follows using program description language, which can be translated into C/C++/Java/Assembler and other software programming languages, or executable machine code of CPU/Microprocessor and DSP:

```
(At the beginning of a software section, in case that there is a patch
for updating this section)
        Jump to Label_P
Label_P:  Patch-Correction-Routine
Label_O:  ORIGINAL SOFTWARE CODE
```

In this case, the CPU/Microprocessor or DSP instruction pointer will be directed to the Patch-Correction-Routine. The design schemes of the Patch-Correction-Routine have been discussed in the previous section 3.3.1. It should be noted that in FLASH memory, changing a value from "1" to "0" is allowed, while changing from "0" to "1" is not allowed. Therefore, by setting the initial jump offset as hexadecimal "0xFFF" allows decreasing the offset during patch programming.

3.3.3 Designing Update-Processing-Routine Using Direct Jump/Branch Instructions

The following description illustrates another exemplary design and implementation of the Update-Processing-Routine in accordance with one embodiment of the present invention. When there is no corresponding patch programmed in the patch area for updating the section, the Update-Processing-Routine can be shown as follows using program description language, which can readily be translated into C/C++/Java/Assembler and other software programming languages, or executable machine code of CPU/Microprocessor and DSP:

```
(At the beginning of a software section in case of no patch programmed)
        Jump to Label_O
Label_O:  ORIGINAL SECTION CODE
```

When there is no corresponding patch programmed in the patch area for updating the software section, the first and the only instruction of the Update-Processing-Routine is to JUMP to Label_O, which is the start address of the original code of the section.

When there is a corresponding patch programmed in the patch area for updating the software section, the first and the only instruction of the Update-Processing-Routine will be changed, so that the CPU/DSP execution will be directed to the start address of a Patch-Correction-Routine or the start address of patch program. The Update-Processing-Routine can be shown as follows using program description language, which can be translated into C/C++/Java/Assembler and other software programming languages, or executable machine code of CPU/Microprocessor and DSP:

```
(At the beginning of a software section, in case that there is a patch
for updating this section)
        Jump to Patch-Correction-Routine (or Patch Start
Address)
Label_O:  ORIGINAL SECTION CODE
```

The design schemes of the Patch-Correction-Routine have been discussed in the previous section 3.3.1.

The following description illustrates an example of using ARM® (Advanced RISC Machines) CPU assembly language, especially, for the ARM mode that uses 32-bit instruction set.

```
(At the beginning of a software section, in case of no patch programmed)
        B    Label_O
                Label_O:  ORIGINAL SECTION CODE
```

In this example, the branch instruction "B" of ARM CPU is used as the Update-Processing-Routine. Because it jumps to the next line, its offset becomes "0xFFFFFF". Because a bit in FLASH memory can be changed from "1" to "0" during FLASH programming, this offset value "0xFFFFFF" can be easily changed to any other 24-bit values in FLASH programming process.

After a patch for updating this section is received, the patch program is written into patch program area. The "B" instruction offset will be changed from "0xFFFFFF", corresponding to jumping to Label_O, to an offset value corresponding to jumping to the start address of patch program.

```
    (At the beginning of a software section, in case that there is a patch
for updating this section)
        B    Patch_Start_Address
                Label_O:  ORIGINAL SECTION CODE
```

3.4 Software Updating Based on Patch-Operation-Area

This section introduces techniques to allocate or reserve Patch-Operation-Areas for patch operation in a software program. A Patch-Operation-Area is defined as a memory area or a block of data bytes that can be used for patch operation. It can be, for example, the memory area for containing the Update-Processing-Routines described in the above sections, the memory area for storing the JUMP commands for directing CPU/DSP instruction pointer to the start address of a patch program, the memory area for storing the Patch-Control-Routines, and the memory area for containing patch program.

Similar to the section 3.1, a group of locations L1, L2, . . . , Ln, in the order from small address to large address, should be determined at first. Accordingly, the embedded software is effectively "separated" into a plurality of software sections, S1, S2, . . . , Sn. A Patch-Operation-Area is allocated or reserved at some or most, if not every, location of L1, L2, . . . , Ln. Some Patch-Operation-Areas can also be inserted or reserved at the end of the embedded software, or at a location of memory area outside of the embedded software code area.

Some implementations may also directly reserve memory areas in the original embedded software, and use these memory areas as the Patch-Operation-Areas for updating the embedded software. In this case, the above term "allocating" is more akin to "reserving" memory areas by some instructions of the embedded software.

When a Patch-Operation-Area is defined and used as an Update-Processing-Routine, it can be placed in each software section of the embedded software as shown in the above sections.

In the following, an example is shown of allocating/reserving the Patch-Operation-Areas into assembler program. In an assembler program, normally we can declare certain data areas in assembler instructions and use the data areas to contain certain constant parameters or a block of data. Based on this feature, we can declare certain data areas in software program and use the data area especially for software patch operation. When FLASH memory is used in digital products to contain software program, certain data areas can also be declared as being filled with "0XFF" hexadecimal numbers. As such, later on, patching process can easily change these "0xFF" hexadecimal numbers into patch program codes, such as the program codes of the Patch-Correction-Routines, the program codes of the Patch-Control-Routines, or the program codes for updating a software section or fixing an error. This is based on the fact that content in a conventional FLASH memory can only be changed from "1" to "0", but cannot be changed from "0" to "1". We can also initially define certain program codes in the Patch-Operation-Area especially for patch operation.

When the CPU runs to a software section that has a patch in the patch program area for updating this section, the CPU instruction pointer should be directed to the place where the patch program starts, such as the patch start address 502 and 602 of FIG. 5 and FIG. 6, respectively. However, jump/branch assembler codes typically have their maximum jump range. For example, when an ARM CPU is in the THUMB mode, the maximum branch range of the branch assemble code B is only ±2048 bytes. If the CPU instruction pointer cannot be shifted to the place of the patch start address with one jump/branch assembler code, multiple jump/branch codes can be used for long jumps. For example, when the ARM CPU is in the THUMB mode, we can use the Branch assemble code "B" and the Long Branch With Link assemble code "BL" for a jump/branch longer than ±2048 bytes. And we need to reserve the Patch-Operation-Area for these multiple jump/branch codes. In the following, we describe a technique to save memory space when allocating the Patch-Operation-Area for these jump/branch codes.

First, we insert a jump/branch command into every software section. For example, when the ARM CPU is in the THUMB mode, we insert the jump/branch assemble code "B" that has maximum branch range ±2048 bytes. We set offset of this jump/branch command so that it jumps to the next command. Therefore, the result of CPU operation is the same as the original code without this jump/branch command. This scheme has been shown in Section 3.3.3.

A Patch-Operation-Area may contain an area for a Patch-Control-Block. A Patch-Control-Block functions as the Patch-Control-Routine and may contain the secondary jump/branch commands. When a FLASH memory is used, the Patch-Control-Block can be declared as being filled with "0xFF" hexadecimal numbers. As such, FLASH programming of the patching process can easily change these "0xFF" hexadecimal numbers into any program code, such as secondary jump/branch code. Multiple software sections may share one Patch-Control-Block.

FIG. 7 shows how an exemplary Patch-Control-Block handles the jump to patch program area. A short jump 706 takes the execution from software section 710 to Patch-Control-Block 709, which works as a Patch-Control-Routine. A second jump 711 takes the execution to patch start address 702 of patch program 707. Upon execution of patch program 707, it jumps back to end of the software section 710.

The following example program written with software description language shows a Patch-Control-Block is shared by four software sections, Section-A, Section-B, Section-C, and Section-D. In this example, the Patch-Operation-Area of Section-A is defined as an Update-Processing-Routine "Jump to Label_O_A "; the Patch-Operation-Area of Section-B is defined as an Update-Processing-Routine "Jump to Label_O_B"; the Patch-Operation-Area of Section-C is defined as a data block area of N bytes being filled with hexadecimal 0xFF, which is used as a Patch-Control-Block and an Update-Processing-Routine "Jump to Label_O_C"; the Patch-Operation-Area of Section-C is defined as an Update-Processing-Routine "Jump to Label_O_D".

```
(At the beginning of Section-A, when there are no patches for updating Section-A.
        Jump to Label_O_A
    Label_O_A:   ORIGINAL SECTION-A CODE
    (At the beginning of Section-B, when there are no patches for updating Section-B)
        Jump to Label_O_B
    Label_O_B:   ORIGINAL SECTION-B CODE
    (At the beginning of Section-C, when there are no patches for updating Section-C)
        Jump to Label_O_C
    Declare a data block area of N bytes being filled with hexadecimal 0xFF, which is
used as a Patch-Control-Block.
(0xFF, 0xFF, . . ., 0xFF)
    Label_O_C:   ORIGINAL SECTION-C CODE
    (At the beginning of Section-D, when there are no patches for updating Section-D
        Jump to Label_O_D
    Label_O_D:   ORIGINAL SECTION-D CODE
```

Upon receiving a software patch, the patching process starts FLASH programming process to change the offset of the jump/branch command in the corresponding software section, and also change some bytes in the corresponding Patch-Control-Block from "0xFF" into the secondary jump/branch command, or some DSP/CPU instruction code working as the Patch-Correction-Routine that has been discussed in Section 3.3.1. For example, upon receiving a patch for updating Section-A, the first several bytes in the Patch-Control-Block will be changed to the instructions of the Patch-Correction-Routine of Section-A. And upon receiving a patch for updating Section-D, the next several bytes in the Patch-Control-Block will be changed to the instructions of the Patch-Correction-Routine of Section-D. These Patch-Correction-Routines will direct CPU/DSP instruction pointer to the start address of a patch program.

3.5 Compilation Upon Allocating Patch Operation Routines

After allocating the Update-Processing-Routines or the Patch-Operation-Areas in the original embedded software, some complications may occur when we compile the software.

In the following, we introduce a technique to avoid program word alignment problem in compilation. As stated in the above, for each software section, an Update-Processing-Routine can be allocated for checking whether there is a patch in the patch area for updating this section. We can also allocate Patch-Control-Blocks in program code by declaring multiple blocks of memory space between assembler codes as parameter data area that can be used as the Patch-Operation-Area to contain the secondary jump/branch commands. However, the code insertion may cause some complications in compilation. For example, during program compilation, some CPUs may request program word align-

```
(At the beginning of Section-A, when there is a patch for updating Section-A.
        Jump to Label_P_A
Label_O_A:   ORIGINAL SECTION-A CODE
(At the beginning of Section-B, when there are no patches for updating Section-B)
        Jump to Label_O_B
Label_O_B:   ORIGINAL SECTION-B CODE
(At the beginning of Section-C, when there are no patches for updating Section-C)
        Jump to Label_O_C
Data block area of N bytes, which is used as Patch-Control-Block
    (
Label_P_A:   Patch-Correction-Routine of Section-A
Label_P_D:   Patch-Correction-Routine of Section-D
        Other remaining bytes 0xFF, 0xFF, . . ., 0xFF
    )
Label_O_C:   ORIGINAL SECTION-C CODE
(At the beginning of Section-D, when there is patch for updating Section-D
        Jump to Label_P_D
Label_O_D:   ORIGINAL SECTION-D CODE
```

In the following, we will introduce a technique to reduce the size of the Patch-Control-Block. In some cases where it is important to save FLASH memory or there are some restrictions on using memory space, it becomes necessary to reduce the FLASH memory usage as much as possible. One way to reduce FLASH memory usage for patch operation is to reduce the size of the Patch-Control-Blocks. In the above example, the Patch-Control-Block is shared by four software sections, Section-A, Section-B, Section-C and Section-D. However, if the probability that all these four sections have their corresponding patches simultaneously is very low, then the size of a Patch-Control-Block can be designed in such a way that it only has the space for handling three software sections or just two software sections.

ment. For example, when using an ARM CPU in the THUMB mode, assembler code LDR may need an offset address that can be divided by 4 bytes. Therefore, when we insert the jump/branch commands and Patch-Control-Blocks for patch operation, we need to adjust the bytes we insert so that the offset address of LDR can be divided by 4 bytes. That is, by adjusting the bytes inserted for patch operation, we can avoid program word alignment requirements in compilation.

In the following, we introduce a technique to avoid offset out of range issue in compilation. For example, when using the ARM CPU in the THUMB mode, assembler code LDR can be used to load some data at offset less than 2048 bytes from the LDR code. If some codes being inserted for patch operation between the LDR and the offset address contain some data to need to be loaded, the offset value of LDR code can be larger than 2048 bytes, causing compilation problems. One technique to avoid such kind of problems is to move the data that need to be loaded to a place that is closer to some assembly code (such as LDR code) so that the offset value can be less than 2048 bytes. That is, by moving or copying the data that need to be loaded by some assembler codes (such as LDR) to places that are closer to the assembler codes (such as LDR) that load the data, we can avoid "out of range" problems in compilation for some assembler codes.

Similarly, after allocating some patch process related bytes into the embedded software, some original program code, such as B command of the ARM assembler code, may become out of range, i.e., destination becomes too far for B to jump to. Inserting another jump/branch command between the B and the destination can prevent the "out of range" problem in compilation. That is, jumping twice for a long jump.

3.6 Update Patch Program with New Patches

After a digital product successfully programs a received patch, it will start to use the instead of executing the corresponding original code in the software section. However, even the programmed patch program may still have some problems sometimes, or the patch program is necessary to be updated after a period of time. A technique of updating the patch program is now described as follows.

In order to update a patch that has been programmed in the digital product, a new patch can be made to update the patch. To support this feature, when a patch is being designed, some code space for patch operations of new patches in the future should be reserved; or similar to updating a software section described in the previous sections, an Update-Processing-Routine can be inserted to the patch program. Therefore, when CPU/DSP runs to a software section of an old patch that has a new patch for updating, the CPU/DSP pointer can be directed to use the new patch program instead of using old patch program, by the Update-Processing-Routine.

All the techniques described in this application for designing a patch for updating a software section of a software program can be used for designing a patch for updating another existing patch.

3.7 To Avoid Effects of Compiler Optimization Process

Embedded software can be written with C/C++/Java/ Assembler or other software programming languages. If a software program is not written with Assembler code, but with C/C++/Java or other software programming languages, the program can be translated into assembler code by using software compiler tools. Software compiler tools may perform optimization processes on the software program, and may change/optimize the original program during compilation that transforms the program written in C/C++/Java or other software programming languages into object code or assembler code. Because of this optimization, some program code may disappear. Therefore, if we allocate the Update-Processing-Routines directly into the C/C++/Java program, the Update-Processing-Routine may be changed or removed during the process of compiler optimization. However, after compilation, normally there are no code optimization processes at the stage of transforming assembler code into object code, and also there are no code optimization processes at the stage of linking object codes into final executable machine code with software linker tools.

A software program written in C/C++/Java and other software programming languages can be compiled in the following two ways.

Compilation-Method-1: Transform the program code written in C/C++/Java language into object code using software compiler tools (maybe with optimization process). Then, link object codes to generate executable machine code with software linker tools.

Compilation-Method-2: Transform the program code written in C/C++/Java language into assembler code using software compiler tools (maybe with optimization process). Then, transform the assembler code into object code using software assembler tools. Then, link object codes to generate executable machine code with software linker tools.

Normally, the final executable machine code generated by Compilation-Method-1 is identical to the final executable machine code generated by Compilation-Method-2. If a software program is directly written in assembler language, we can transform the program into object code using software assembler tools. Then, link object codes to generate executable machine code with software linker tools.

A technique described herein to allocate the Update-Processing-Routines and the Patch-Operation-Area into a software program is to use the Compilation-Method-2. In the Compilation-Method-2, after transforming the program code written in C/C++/Java language into assembler code using software compiler tools (may with optimization process), the Update-Processing-Routines, the Patch-Control-Routines, and the Patch-Operation-Area can be inserted into the assembler code. Because there will be no optimization processes that may change or optimize software code in the compilation processes of transforming the assembler code into object code and linking object codes to generate executable machine code, the patch routines and patch program space can remain intact.

Another method can be that, transform the program code written in C/C++/Java or Assembler language into object code, then insert the Update-Processing-Routines, the Patch-Control-Routines, or the Patch-Operation-Areas into the object codes. And then, link object codes to generate executable machine code with software linker tool.

3.8 Allocating Patch Operation Routines with Software Tools

Anther aspect of the present invention is the methodology to allocate or insert the aforementioned Update-Processing-Routines and Patch-Operation-Area into the embedded software of the digital products, such as cellular phones. As digital products are manufactured in production, they must be programmed with embedded software to become operational, before they can be released to market. The Update-Processing-Routines and/or Patch-Operation-Area should preferably be allocated in embedded software of digital products, before the digitals products are programmed with the embedded software.

To efficiently allocate the Update-Processing-Routines and the Patch-Operation-Area into the embedded software of digital products, another aspect of the present invention provides an allocation software tool for automatic allocation.

One embodiment of the allocation tool integrates the allocation process with the compilation process of the embedded software. For example, prior to the compilation of the source code, the allocation tool can be started automatically to finish the allocation. In this way, software developers will just concern themselves with their original task of code development, without getting involved in or worrying about the allocation process.

For example, one embodiment of the allocation process may be performed on the assembler code instead of on the C/C++/Java code. In this situation, C/C++/Java code will first be compiled into the corresponding assembler code, and then, the allocation process will be performed on the generated assembler code to insert the Update-Processing-Routines and Patch-Operation-Area. Then, the assembler code will be further compiled into object code. In this way, any optimization processes in the compliers of C/C++/Java code will not affect the Update-Processing-Routines and the Patch-Operation-Area.

Two examples of the allocation software tool are shown as follows, although those skilled in the art can readily develop their own allocation tool based on the teaching of the present invention.

EXAMPLE-A

For every N lines (or bytes) of the software code, where N is a predefined number and the software code may be written in C/C++/Java/Assembler and other software programming languages, or executable machine code of CPU/Microprocessor and DSP, the allocation tool inserts an Update-Processing-Routine and/or a block of Patch-Operation-Area into the software code. The allocation tool may also change the parameters and labels in the Update-Processing-Routine according to the corresponding section identifier when necessary. The allocation is operated directly in the original files that contain the source code of the embedded software.

EXAMPLE-B

In some applications, the embedded software of a digital product has more than one files that contain the source code of the embedded software. For each file, the allocation tool generates another file that contains the same software code as the original file, i.e., making a copy of the file. Then, the allocation tool will insert the Update-Processing-Routines and/or Patch-Operation-Area into the duplicate files, instead of using the original files. That is, for every N lines (or bytes) of the software code in the generated files, where N is a predefined number and the software code may be written in C/C++/Java/Assembler and other software programming languages, or executable machine code of CPU/Microprocessor and DSP, the allocation tool inserts an Update-Processing-Routine and/or a block of Patch-Operation-Area into the software code. The allocation tool may also change the parameters and labels in the Update-Processing-Routine according to the corresponding section identifier when necessary.

4. Patch Transmission and Patch Receiving 4.1 Patch Data Transmission.

First, we describe how the software patch may be transmitted from a patch server (to be described below) to digital products. An example of transmitting patch data using certain communication layers is shown in FIG. 8. Some implementation may only include one or two of the three layers for controlling patch data transmission, depending on the transmission design schemes and needs. Some other implementation may use data transmission channels or transmission path, such as circuit data transmission or packet data transmission. Some other implementation may use voice or video transmission channels, by putting patch data into these channels or transmission paths and send the patch data to digital products.

By "patch server," it should be appreciated by those skilled in the art that it may be a system that can dispatch or transmit a software patch to one or more digital products in the field, preferably through existing communication infrastructure or channels, such as a wireless link, or a wired connection. The patch server may have any level of automation for its operation. Upon transmission, a digital product receives patch data with its Patch Receiving Module 302 shown in FIG. 3.

During or after the patch data transmission, the digital product may send signals (or messages) to the patch server for acknowledgment. Another example is that, the digital product may send signals (or messages) to a Patch-Reply-Message-Collector, instead of a patch server. Then, the Patch-Reply-Message-Collector will send a corresponding signal and data to the patch sever. The Patch-Reply-Message-Collector is a message receiver that collects reply message from the digital products. It can be located at a different place from the patch server.

For digital cellular phones using CDMA technology based on TIA/EIA-95 and CDMA2000 standards, Data Burst Messages can be used to carry patch data. One example of using the Data Burst Messages is to use the SMS message transmission based on TIA/EIA-637 standard. In the following, an example of using the SMS messages to deliver patch data will be described, although those skilled in the art of data transmission may readily devise their own delivery mechanism using other signal messages. Since there are already error detection processes in the communication protocol of SMS message transmission (TIA/EIA-637), using SMS as a lower layer for patch transmission, digital product will receive nearly-error-free patch data packets.

With reference to FIG. 8, an exemplary Link Layer 820 for patch transmission in accordance with one embodiment of the present invention will now be described. Link Layer 820 is to reliably transmit patch signaling messages 800 and patch data 810 by detecting transmission errors and performing retransmission in error cases. Error detection can be based on CRC (Cyclic Redundancy Codes), checksum or other schemes as can readily be implemented by those skilled in the art. Link Layer 820 may also include security check mechanism. For example, before patch data is sent out, the patch server may encrypt the patch data with some encryption algorithm and then send the patch data to digital products. When a digital product receives a patch, it will perform decryption algorithm on the patch data to check correctness of the received patch data.

In an exemplary use of SMS messages, after a patch data packet carried by an SMS message is received, the message is passed to the decryption module where CRC checking process and message decryption process are performed to check the correctness of the patch data packet.

In the event that a digital product cannot correctly receive patch data, the patch server shall re-send the patch data to the digital product. For example, patch retransmission can be based on a timer-based mechanism: The patch server has a timer for patch retransmission. After the patch server sends out a patch to a digital product, it will start the timer. If the patch server does not receive any corresponding reply message (e.g., patching status report) from the digital product when the timer times out, the patch server will re-send the patch data packets to the digital product. In some special cases where a patch server does not receive any reply messages from the digital product after the patch server has performed patch re-transmission for a predetermined number of times, the patch server may stop the retransmission for a while. It should be appreciated by those skilled in the art that other ways of timing the transmission and retransmission of patches can readily be implemented in connection with the teaching of the present invention.

In the previous example of using SMS messages, there is one patch signaling message named Patch Status Report, which is sent from a digital product to a patch server and contains the current patch status information of the digital product. If the digital product receives a patch without error, it will send Patch Status Report via a reverse SMS message to the patch server at the time:

(a) when the digital product finds out that the received patch had been already programmed successfully, or (b) when the digital product successfully finishes the patch programming.

4.2 Patch Data Composition.

With reference to FIG. 9, the composition of patch data 940 is now further described. Patch data 940 is preferably separated into several patch data packets, and one patch data packet can be carried by one message of the relay layer 820.

In the exemplary use of SMS messages, one patch data packet may be carried by one SMS message. In order to identify a patch SMS message from other regular SMS messages, the first "k" characters (where "k" is a pre-defined number that can be assigned from zero to any positive number) of the User Data in a patch SMS message can be set to a k-character Magic-Word by the patch server before patch delivery. Following the Magic-Word, a patch data packet is inserted into a SMS message.

The relation between patch data and patch data packets is shown in FIG. 9. A patch data packet 950 can be separated into packet overhead field 945 and payload data field 947. A design example of the packet overhead 945 may contain the following information:

(a) Patch Identifier
(b) Current Packet Number
(c) Last Packet Number

It should be appreciated by those skilled in the art that other ways of design packet overhead for transmitting patch data packets can readily be implemented in connection with the teaching of the present invention.

The payload data 947, 955, 965 in the patch data packet 950 may contain the whole or one part of patch data 940.

The patch data packet 950 may be encrypted by the patch server with some encryption algorithm before transmission. The patch server may encrypt the software patch data by using static and/or dynamic keys: the former can be a CPU identifier, MAC layer address and other telecommunication service related parameters, such as directory number, ESN and TMSI temporary identifications; the later are changeable keys based on location or time or user's profile.

4.3 Patch Data Processing.

After receiving a message that may carry a patch data packet 950, the digital product will check whether the message contains a real patch data packet. The digital product may also perform error detection and/or data decryption on the received message. After successfully receiving all the necessary patch data packets, the digital product will compose the corresponding patch data from the payload data 947, 955, 965 in the packets.

In the exemplary use of SMS messages, when the digital product receives an SMS message, it will check whether the predetermined first k characters in the message are identical to the Magic-Word. If there is a mismatch, the SMS message will be treated as regular SMS message, not a patch data packet.

If there is a match, the digital product will further try to decrypt the message data to check the correctness of the message. If the decryption process shows that the message data is correct, the message data will be treated as a patch data packet, and a buffer may be used to contain the data. Otherwise, the SMS message will be treated as a regular SMS message.

After successfully receiving all the necessary patch data packets based on the information items of the Patch Identifier, the Current-Patch-Number and the Last-Patch-Number in the received patch data packets, the digital product will compose the corresponding patch data from these packets.

The patch data 940 may include some of the following items, such as:

(a) Items to identify whether the received patch is for the digital product, for example,
   ESN (Electronically Serial Number)l
   MIN (Mobile Identification Number) or IMSI (International Mobile Station Identity);
   Manufacture Identifier;
   Product model number;
   Software version number;
   CPU Identifier;
   MAC (Medium Access Control) layer address;
   Other items that can be used for identifying a digital product;
   Other items that can be used for identifying a subscriber.

(b) Items for patch programming, for example,
   Control information to indicate that some patch data should be written into FLASH memory, and/or some patch data should be written into NVM (Non Volatile Memory) memory and/or EEPROM (Electrically Erasable Programmable Read-Only Memory) memory;
   Address information of patch data, which may be memory addresses, sector allocation information or other types of address information of FLASH/NVM/EEROM memory in digital product;
   Patch program codes that can be used for software updating;
   Information of how to interpret patch program codes. For example, the programming language information (C/C++/Java/Assembler and other software programming languages, or executable machine code of CPU/Microprocessor or DSP) that is used in the patch program codes;
   Patch data that can be used for updating some data area or data tables in FLASH memory, NVM, and/or EEPROM memory;
   Software Section Identifiers of the software sections that are updated by this patch;
   Other information to describe patch program and data area update.

(c) Items for patch programming post-process, for example,
   Reset Flag.
   Control flag for sending response messages to patch server.
   Other control signal and data for the post-process of patch programming.

After the received patch data is composed, the digital product may preferably perform decryption process on the composed patch data when necessary. This is to enhance the security checking on patch data. Of course, the patch server side should perform encryption on the patch data before separating them into patch data packets for transmission.

The patch program codes may be written in C/C++/Java/Assembler and other software programming languages, or executable machine codes of CPU/Microprocessor or DSP. The patch data may include some interpretation information for the patch program codes. If the patch program codes can be interpreted based on the interpretation information. Some implementations may include a software module of interpreter to translate the received patch program from one format to another format. In some implementations, patch program can also interpreted or translated into CPU/DSP executable machine codes when CPU/DSP wants to use the patch program.

The patch program contains the software update information to be used as a substitute of a piece of the original program in the embedded software. The patch program may be made to start from a Patch Start Address. Also, for example, and at the end of a patch program, there can be an instruction for jumping back to a predetermined place in the embedded software where the original obsolete/error code has been skipped, or the end of that block of the original obsolete/error code.

The patch data may also contains information for updating data area of FLASH memory, NVM, and/or EEPROM memory. For example, the patch data may contain a new data table for replacing an old data table in NVM memory of a digital product.

The digital product may check if certain information items, for example, ESN, Manufacture Identifier, Product Model Number and Software Version Number, are identical to that stored in the digital product. If there is a mismatch, the digital product may discard the patch data (or treat those messages as regular SMS messages in the example of using SMS messages). If they are matched, the digital product may further check whether the received patch data have been programmed into the memory of the digital product. If not, the digital product will start to program the received patch data. Otherwise, the digital product may send a patch response message to the patch server, and finish the patching process.

5. Patch Programming

Patch programming involves writing patch data into the corresponding patch area in the FLASH memory, and/or writing new parameters into NVM/EEPROM memory. Patch programming is preferably performed when the digital product is idle (i.e., not being used by the user). Writing new parameters into NVM/EEPROM memory can be readily performed using some regular data overwriting process on NVM/EEPROM memory. However, writing data into FLASH memory, especially when the FLASH memory is being read by the digital product may require additional handling in some cases. In order to perform the patch programming on the on-the-fly digital products, a technique of programming FLASH within a RAM memory is described in accordance with one embodiment of the present invention.

5.1 FLASH Programming Using RAM Memory

The software routine for writing data into FLASH memory can be put into RAM memory. There are several ways to put the software routine into RAM memory, as can be appreciated by those skilled in the art. For example, the software routine for writing data into FLASH can be copied into RAM memory by a software routine, before FLASH programming. Another example is that, when we compile the embedded software, we can instruct the compiler to assign the FLASH programming routine to be allocated into RAM memory, so that compiler automatically allocates the routine into the RAM memory. The RAM memory can be the type of on-chip RAM/SRAM memory that is in the chip containing CPU/DSP core, or RAM memory outside the chip that contains the CPU/DSP. When it is necessary to write patch related data into FLASH memory, the software routine for FLASH programming can be executed in the RAM memory. The routine writes data byte into the corresponding FLASH address, reading the FLASH status value, and checking the correctness and completion of the data writing. The task of the FLASH programming function is preferably set at the highest priority level, and also when it starts to run, it preferably first disables all CPU/DSP interrupts, so that while it is running, all the other software tasks and all CPU/DSP interrupts stop and wait.

An alternative way is to run the FLASH programming routine in an interrupt handler, and when the routine starts to run, it will preferably first disables all the other interrupts, so that while it is running, all software tasks and CPU/DSP interrupt routines stop and wait.

Another alternative way to ensure no influences come from other software tasks and interrupt routines during FLASH programming is, before starting FLASH programming routine, stopping software tasks/threads that are not related to the FLASH programming or software patch process and also disabling those unrelated interrupt routines that are not related to the FLASH programming or the software patch process.

5.2 Patch Programming Process

The patch programming process may be divided into several sub-states, one exemplary of which is shown in FIG. 10. Upon successfully receiving patch data, the digital product will write the patch data into the FLASH memory, NVM and/or EEPROM memory of the digital product.

If some patch data are used for updating data area or data tables in FLASH memory, NVM, and/or EEPROM memory, the digital product shall write the data into the corresponding address of the FLASH memory, NVM, and/or EEPROM memory.

If some patch data are used for updating program code of some software sections, the digital product shall write the patch program code into the corresponding address of the FLASH memory.

Then, the digital product may start to write patch identification information into the Patch-Control-Table 1020 or some kinds of patch database. The patch identification information may include information of patch address, Patch Identifier, and software section identifier, etc.

Then, the digital product will go to the next step of the Section Status Programming 1030. Depending on the scheme of designing the Update-Processing-Routines as previously described, the Update-Processing-Routine of a software section may contain either one or two JUMP instructions, or a Patch-Checking-Routine that may check a patch flag. After the patch program has been programmed successfully, if the Update-Processing-Routine is using patch flags, the corresponding patch flag will be changed to reflect the patch existence; if the Update-Processing-Routine is using JUMP instructions, the corresponding JUMP offset shall be changed, so that CPU/DSP instruction pointer will JUMP to the corresponding patch start address. Some data bytes in the Patch-Control-Block and/or in the Patch-Operation-Area may need to be changed by the FLASH programming routine. The detailed changes for the Update-Processing-Routines from the status without a patch programmed to the status with a patch programmed, and the changes on the Patch-Control-Blocks have been described in previous sections.

Programming the key JUMP offset or patch flag change in the Update-Processing-Routines should preferably be at the last, so that the digital product will not malfunction if patch programming is stopped in any time. For example, for changing the Update-Processing-Routine of Section-A previously described in Section 3.4, the digital product shall first change the data bytes in the Patch-Control-Block to the instructions of the Patch-Correction-Routine of Section-A at the Label_P_A. Then, change the Jump to Label_O_A to Jump to Label_P_A by modifying the offset of the JUMP instruction. In this way, switching to use the patch program instead of using the original code will be performed only when all the programming processes are completed.

When patch programming is successfully completed, the digital product will perform some post processes, such as sending patch status message to the patch server, and/or performing system reset if necessary. In the exemplary use of SMS messages, the digital product may perform the post-process shown in the following:

the digital product will send a Patch Status Report via a SMS message to the patch server. The patch status report contains the terminal information and the current patching status;

And then, if the Reset-Flag in the patch data is set, the digital product performs system reset.

6. Patch Server

Reference is now to FIG. 11, where a simplified diagram of an exemplary patch server 1100 is illustrated. A patch server 1100 preferably has a patch database 1130, a patch generator 1110 and a patch transmission controller 1120.

The patch database 1130 stores patch information in connection with each of the digital products. It may also store the following items:

(a) Manufacture Identifier;
(b) Product model number;
(c) Software version number;
(d) Software Section Identifier;
(e) Patch Identifier;
(f) CPU identifier;
(g) MAC (Medium Access Control) layer address;
(h) Other items that can be used for identifying a digital product;
(i) Other items that can be used for identifying a subscriber;
(j) Patch Address Information;
(k) Reset Flag Information;
(l) Patch program code.
(m) Information of how to interpret patch program codes. For example, the programming language information (C/C++/Java/Assembler and other software programming languages, or executable machine code of CPU/Microprocessor or DSP) that is used in the patch program codes;
(n) Data parameter for updating data memory area (NVM/EEPROM) of the digital products.

When the patch server is to deliver a patch to a digital product, the patch generator 1110 generates a corresponding patch data based on the data stored in the Patch Database 1130. The patch generator 1110 may further separate the patch data into several sections and put each section into a patch data packet for transmission when the patch data can not be carried by a single patch data packet.

The patch transmission controller 1120 is to reliably deliver the patch data packets to the digital product. One exemplary design is to include a timer for patch retransmission and its design details are shown in the following.

After the patch server sends out a patch to a digital product, it starts a timer. If the patch server does not receive any corresponding reply message (e.g., patching status report) from the digital product when the timer times out, the patch server will re-send the patch data packets to the digital product. In some special case where the patch server does not receive any reply messages from the digital product when the patch server has performed patch retransmission for a predetermined number of times, the patch server may suspend the retransmission for a while, or just suspend the timer permanently and record the lack of reply in a log file.

Upon receiving a reply message (e.g., patching status report) from a digital product, the patch server will stop the timer of patch retransmission, and update the patching status of the digital product in the patch database.

In the following, an exemplary design is described to show how a software patch is transmitted via SMS messages from the patch server to digital products. This exemplary design is described with reference to FIG. 12.

In this exemplary design, the digital products with embedded software are cellular phones 1250. The patch server hardware is implemented by a computer 1200 and a wireless modem 1210 that is capable of receiving SMS messages. The computer generates patch data and corresponding patch SMS Messages and then sends the messages through the Internet 1205 to a message server 1240 of the service provider that provides the wireless services to digital products 1250. The message delivery to the message server can be based on regular email transmission method using SMTP (Simple Mail Transfer Protocol) and TCP/IP. The message server 1240 of the service provider then transfers the patch SMS messages as regular SMS messages 1225 to base stations 1220. Finally, the base stations 1220 deliver the messages 1225 to corresponding cellular phones 1250 through some air messages, such as, the Data Burst Messages that carrying the SMS messages 1225.

The wireless modem 1210 of the patch server is attached to the computer 1200 of the patch server. The wireless modem is to receive reply messages 1215 from digital products 1250 and transfer the reply messages 1215 to the computer 1200. The computer 1200 will confirm the patching status based on the information carried by the reply messages 1215.

Although the invention is described herein with reference to the preferred embodiment, one skilled in the art will readily appreciate that other applications may be substituted for those set forth herein without departing from the scope of the present invention. Accordingly, the invention should only be limited by the claims included below.

GLOSSARY OF ABBREVIATIONS

ARQ. Automatic Repeat reQuest.

CPU. Central Processing Unit.

CRC. Cyclic Redundancy Codes.

DSP. Digital Signal Processor

EEPROM. Electrically Erasable Programmable Read-Only Memory.

ESN. Electronic Serial Number.

FLASH. A type of constantly-powered nonvolatile memory that can be erased and reprogrammed in units of memory called blocks.

MAC. Media Access Control.

MCU. Micro Processor Unit.

NVM. Non Volatile Memory

Patch data. Data of a total patch transmitted from patch server to a digital product.

Patch data packet. Unit of patch data transmission. One patch can be divided and transmitted with several patch data packets. One patch data packet may be carried by one message.

Patch program. Software program used for software update, which is composed by a one or multiple CPU/DSP instructions, for updating one or multiple program codes of the existing embedded software.

Patch programming. Process to write patch data into memory.

Patch server. One or more server for transmitting patch data to digital products that support patching.

PCMCIA. Personal Computer Memory Card International Association.

PDA. Personal Digital Assistant.

RAM. Random Access Memory.

ROM. Read-Only Memory.

SMS. Short Message Service.

What is claimed is:

1. A method of preparing an embedded software operative in a digital product for field modification by a software patch, comprising the steps of:

a) determining a plurality of insertion locations for said embedded software based on a predetermined criteria, each of said one insertion locations defining one section of said embedded software;

b) allocating a plurality of update processing routines at said plurality of insertion locations, each of said update processing routines being adapted to modify execution of said embedded software at a corresponding section when a software patch exists for said section;

c) determining a memory area in said digital product for use by said software patch;

d) loading said embedded software with said plurality of update processing routines into an embedded software code area of said digital product.

2. The method of claim 1, wherein said memory area is located inside of said embedded software code area.

3. The method of claim 1, wherein said memory area is located outside of said embedded software code area.

4. The method of claim 1, wherein said step of determining insertion locations is based on at least one of the following methods:
   based on number of lines of program software of said embedded software;
   based on unit of function of said embedded software;
   based on type of instruction of said embedded software;
   based on a software design scheme of said digital product;
   based on a hardware design scheme of said digital product;
   based on a modification scheme of said embedded software;
   based on an error correction scheme of said embedded software.

5. The method of claim 1, said step of allocating a plurality of update processing routines is based on at least one of the following methodology:
   a) allocating said update processing routines in said embedded software before compiling said embedded software into executable machine code;
   b) compiling said embedded software into corresponding assembly program code, allocating said update processing routines in said assembly program code, and then compiling said assembly program code into executable machine code;
   c) compiling said embedded software into corresponding object code, allocating said update processing routines in said object code, and then compiling said object code into executable machine code;
   d) compiling said embedded software into executable machine code, allocating said update processing routines in said executable machine code.

6. The method of claim 1, wherein said step of allocating a plurality of update processing routines further comprises modifying at least one program instruction of said embedded software.

7. The method of claim 5, wherein said step of allocating a plurality of update processing routines further comprises modifying at least one program instruction of said embedded software.

8. The method of claim 1, wherein at least one of said update processing routines is adapted to:
   if there is a software patch for updating a section of said embedded software, direct execution of said embedded software to a location of said software patch for execution;
   if there is no such a software patch, use said section of said embedded software for execution.

9. The method of claim 4, wherein at least one of said update processing routines is adapted to:
   if there is a software patch for updating a section of said embedded software, direct execution of said embedded software to a location of said software patch for execution;
   if there is no such a software patch, use said section of said embedded software for execution.

10. The method of claim 1, wherein at least one of said update processing routines is adapted to:
    check whether there is a software patch for updating a section of said embedded software, and
    if there is such a software patch, direct execution of said embedded software to a location of said software patch for execution;
    if there is no such a software patch, use said section of said embedded software for execution.

11. The method of claim 4, wherein at least one of said update processing routines is adapted to:
    check whether there is a software patch for updating a section of said embedded software, and
    if there is such a software patch, direct execution of said embedded software to a location of said software patch for execution;
    if there is no such a software patch, use said section of said embedded software for execution.

12. The method of claim 8, wherein said step to direct execution of said embedded software to a location of said software patch further comprises:
    direct execution of said embedded software to a first location of a patch control routine, and then direct execution of said embedded software to a second location of said software patch based on said patch control routine, and use said software patch for execution.

13. The method of claim 10, wherein said step to direct execution of said embedded software to a location of said software patch further comprises:
    direct execution of said embedded software to a first location of a patch control routine, and then direct execution of said embedded software to a second location of said software patch based on said patch control routine, and use said software patch for execution.

14. The method of claim 1, wherein said plurality of update processing routines comprise at least one of:
    first routine adapted to, if there is a software patch for updating a section of said embedded software, direct execution of said embedded software to a location of said software patch for execution, if there is no such a software patch, use said section of said embedded software for execution;
    second routine adapted to check whether there is a software patch for updating a section of said embedded software, and if there is such a software patch, direct execution of said embedded software to a location of said software patch for execution, if there is no such a software patch, use said section of said embedded software for execution;
    third routine adapted to check whether there is a software patch for updating a section of said embedded software, and if there is such a software patch, direct execution of said embedded software to a first location of a patch control routine, and then direct execution of said embedded software to a second location of said software patch based on said patch control routine for execution, if there is no such a software patch, use said section of said embedded software for execution;
    fourth routine adapted to, if there is a software patch for updating a section of said embedded software, direct execution of said embedded software to a first location of a patch control routine and direct execution of said embedded software to a second location of a software patch based on said patch control routine for execution, if there is no such a software patch, use said section of said embedded software for execution.

15. The method of claim 1, further comprising:
    e) generating a software patch, adapted to provide a predetermined function;

f) transmitting said software patch to said digital product through a communications link;

g) receiving said software patch by said digital product;

h) writing said software patch into said memory area.

16. The method of claim 8, further comprising:

e) generating a software patch, adapted to provide a predetermined function;

f) transmitting said software patch to said digital product through a communications link;

g) receiving said software patch by said digital product;

h) writing said software patch into said memory area.

17. The method of claim 10, further comprising:

e) generating a software patch, adapted to provide a predetermined function;

f) transmitting said software patch to said digital product through a communications link;

g) receiving said software patch by said digital product;

h) writing said software patch into said memory area.

18. The method of claim 12, further comprising:

e) generating a software patch, adapted to provide a predetermined function;

f) transmitting said software patch to said digital product through a communications link;

g) receiving said software patch by said digital product;

h) writing said software patch into said memory area.

19. The method of claim 15, further comprising the step of using said software patch to overwrite at least a portion of said update processing routine in said embedded software.

20. The method of claim 19, wherein said portion is a predetermined jump offset.

21. The method of claim 15, wherein said step of generating comprises using a patch server, which has at least one of the following functions, handling generating said software patch;

handling encrypting said software patch with a predetermined encryption algorithm.

22. The method of claim 15, wherein said step of transmitting comprises using a patch server, which has at least one of the following functions, handling transmitting said software patch;

handling receiving at least one of messages from said digital product;

handling re-transmitting said software patch.

23. The method of claim 22, further comprising sending at least one message from said digital product to said patch server in at least one of the following timing after receiving of said software patch by said digital product;

after writing said software patch into said memory area.

24. The method of claim 1, wherein said software patch includes at least one of the followings:

manufacture identifier;

product model number;

software version number;

software section identifier;

patch identifier;

CPU identifier;

MAC layer address;

patch address information;

patch program for updating said embedded software;

information of how to interpret patch program;

reset flag information;

information items that can be used for post-process of patch programming;

information items that can be used for identifying a digital product;

information items that can be used for identifying a subscriber;

data parameter for updating data area of said digital product.

25. A method of preparing an embedded software operative in a digital product for field modification by a software patch, comprising the steps of:

a) determining a plurality of insertion locations for said embedded software based on a predetermined criteria, at least two of said insertion locations defining two sections for said embedded software;

b) allocating a plurality of patch operation areas in said embedded software;

c) setting said patch operation areas with a first content which is selectively changeable to a second content;

d) loading said embedded software with said plurality of patch operation areas into said digital product.

26. The method of claim 25, wherein said step of allocating comprises:

allocating said patch operation areas at said insertion locations of said embedded software.

27. The method of claim 25, further comprising allocating at least one of patch operation areas at a predetermined memory area outside of said embedded software code area.

28. The method of claim 26, further comprising allocating at least one of patch operation area at a predetermined memory area outside of said embedded software code area.

29. The method of claim 25, wherein said step of allocating comprises:

reserving memory areas in said embedded software for use as said patch operation areas by program instruction in said embedded software.

30. The method of claim 26, wherein said step of allocating comprises:

reserving memory areas in said embedded software for use as said patch operation areas by program instruction in said embedded software.

31. The method of claim 27, wherein said step of allocating comprises:

reserving memory areas in said embedded software for use as said patch operation areas by program instruction in said embedded software.

32. The method of claim 25, wherein said step of determining insertion locations is based on at least one of the following methods:

based on number of lines of program software of said embedded software;

based on unit of functions of said embedded software;

based on types of instructions of said embedded software;

based on a predetermined software design scheme of said digital product;

based on a predetermined hardware design scheme of said digital product;

based on a predetermined modification scheme of said embedded software;

based on a predetermined error correction scheme of said embedded software.

33. The method of claim 25, wherein said step of allocating further comprises modifying at least one program instruction of said embedded software.

34. The method of claim 25, wherein said patch operation areas comprise at least one of the following:
- a first update processing routine adapted to, if there is a software patch for updating a section of said embedded software, direct execution of said embedded software to a location of said software patch for execution; if there is no such a software patch, use said section of said embedded software for execution;
- a second update processing routine adapted to check whether there is a software patch for updating a section of said embedded software, and if there is such a software patch, direct execution of said embedded software to a location of said software patch for execution; if there is no such a software patch, use said section of said embedded software for execution;
- a third update processing routine adapted to check whether there is a software patch for updating a section of said embedded software, and if there is such a software patch, direct execution of said embedded software to a first location of a patch control routine, and then direct execution of said embedded software to a second location of said software patch based on said patch control routine for execution; if there is no such a software patch, use said section of said embedded software for execution;
- a fourth update processing routine adapted to, if there is a software patch for updating a section of said embedded software, direct execution of said embedded software to a first location of a patch control routine and direct execution of said embedded software to a second location of a software patch based on said patch control routine for execution; if there is no such a software patch, use said section of said embedded software for execution;
- a fifth update processing routine adapted to check whether there is a software patch and if so, to modify execution of said embedded software for a corresponding section to jump to said software patch for execution;
- a jump instruction adapted to modify execution of said embedded software for a corresponding section if there is said software patch, and to jump to said section if there is no said software patch;
- a jump offset value selectably changeable to another jump offset value for use by said jump instruction;
- a patch control routine adapted to cause jumping to said software patch;
- a patch program adapted to modify execution of said embedded software;
- a patch control block selectably changeable to a patch correction routine;
- a first memory area set to a pre-determined content used to modify execution of said embedded software;
- a second memory area set to a pre-determined content changeable to a parameter used to modify execution of said embedded software;
- a third memory area set to a pre-defined content changeable to a software program used to modify execution of said embedded software.

35. The method of claim 34, wherein said patch control block is shared by a plurality of sections of said embedded software.

36. The method of claim 25, wherein timing of said step of allocating a plurality of patch operation areas is based on at least one of the following methodology:
a) allocating at least one of said patch operation areas in said embedded software before compiling said embedded software into executable machine code;
b) compiling said embedded software into corresponding assembly program code, allocating at least one of said patch operation areas in said assembly program code, and then compiling said assembly program code into executable machine code;
c) compiling said embedded software into corresponding object code, allocating at least one of said patch operation areas in said object code, and then compiling said object code into executable machine code;
d) compiling said embedded software into executable machine code, allocating at least one of said patch operation areas in said executable machine code.

37. The method of claim 25, further comprising:
e) generating a software patch, adapted to provide a predetermined function;
f) transmitting said software patch to said digital product through a communications link;
g) receiving said software patch by said digital product;
h) writing said software patch into at least one of said patch operation areas.

38. The method of claim 27, further comprising:
e) generating a software patch, adapted to provide a predetermined function;
f) transmitting said software patch to said digital product through a communications link;
g) receiving said software patch by said digital product;
h) writing said software patch into at least one of said patch operation areas.

39. The method of claim 28, further comprising:
e) generating a software patch, adapted to provide a predetermined function;
f) transmitting said software patch to said digital product through a communications link;
g) receiving said software patch by said digital product;
h) writing said software patch into at least one of said patch operation areas.

40. The method of claim 29, further comprising:
e) generating a software patch, adapted to provide a predetermined function;
f) transmitting said software patch to said digital product through a communications link;
g) receiving said software patch by said digital product;
h) writing said software patch into at least one of said patch operation areas.

41. The method of claim 34, further comprising:
e) generating a software patch, adapted to provide a predetermined function;
f) transmitting said software patch to said digital product through a communications link;
g) receiving said software patch by said digital product;
h) writing said software patch into at least one of said patch operation areas.

42. The method of claim 37, wherein said step of writing comprises the step of using said software patch to change at least one jump offset.

43. The method of claim 37, wherein said step of generating comprises using a patch server, which has at least one of the following functions,
handling generating said software patch;
handling encrypting said software patch with a predetermined encryption algorithm.

44. The method of claim 37, wherein said step of transmitting comprises using a patch server, which has at least one of the following functions, handling transmitting said software patch;

handling receiving at least one of messages from said digital product;

handling re-transmitting said software patch.

45. The method of claim 37, wherein said step of transmitting comprises sending said software patch using Data Burst Messages defined in CDMA standards.

46. The method of claim 44, further comprising sending at least one message from said digital product to said patch server in at least one of the following instances:

after receiving of said software patch by said digital product;

after writing said software patch into said patch operation area.

47. The method of claim 37, wherein said software patch comprises at least one of the following information:

manufacture identifier;

product model number;

software version number;

software section identifier;

patch identifier;

CPU identifier;

MAC layer address;

patch address information;

patch program for updating said embedded software;

information of how to interpret patch program;

reset flag information;

information items that can be used for post-process of patch programming;

information items that can be used for identifying a digital product;

information items that can be used for identifying a subscriber;

data parameter for updating data area of said digital product.

48. The method of claim 37, further comprising interpreting at lease one item of said software patch by said digital product in at least one of the following ways:

changing said at lease one item from a first software language format to a second software language format before writing said software patch into said patch operation area;

changing said at lease one item from a first software language format to a second software language format before using said software patch for execution;

changing said at lease one item from a first data format to a second data format before writing said software patch into said patch operation area;

changing said at lease one item from a first data format to a second data format before using said software patch for execution.

49. The method of claim 37, wherein writing said software patch into said patch operation area is performed by at least one FLASH programming routine adapted to write data into FLASH memory.

50. The method of claim 49, wherein said step of writing said software patch further comprises putting into said FLASH programming routines into RAM memory before FLASH programming.

51. A method of modifying a digital product having FLASH memory and non-volatile memory (NVM), said digital product being operated by an embedded software, comprising the steps of:

a) generating a software patch, said software patch comprising one of at least a patch program for updating content in FLASH memory, and at least one data parameter for updating NVM content;

b) transmitting said software patch to said digital product using a wireless communication link;

c) receiving said software patch by said digital product;

d) writing said software patch into said digital product.

52. The method of claim 51, wherein said step of writing comprises at least one of the following steps:

writing said at least one data parameters to said NVM by overwriting existing data in said NVM;

writing said at least a piece of patch program to said FLASH memory.

53. The method of claim 52, further comprising at least one of the following steps:

writing identification information of said software patch to a patch control tables for said embedded software;

writing patch control information of said software patch to a patch control table for said embedded software.

54. A computer readable medium comprising instructions for updating an embedded software for a digital product, comprising instructions for:

executing said embedded software;

determining whether a patch program is available for a section of said embedded software;

directing execution of said embedded software at said section to said patch program if said patch program is available for said section;

directing execution back to a predetermined location of said embedded software after execution of said patch program.

* * * * *